United States Patent [19]

Owada et al.

[11] Patent Number: 5,327,304
[45] Date of Patent: Jul. 5, 1994

[54] TAPE DRIVE CONTROLLING DEVICE

[75] Inventors: Mitsuru Owada; Takashi Kimura; Keiichi Fukuzawa, all of Kanagawa, Japan

[73] Assignee: Canon Kabushiki Kaisha, Tokyo, Japan

[21] Appl. No.: 752,872

[22] Filed: Aug. 30, 1991

[30] Foreign Application Priority Data

| Sep. 12, 1990 | [JP] | Japan | 2-239819 |
| Nov. 14, 1990 | [JP] | Japan | 2-306013 |
| Nov. 14, 1990 | [JP] | Japan | 2-306014 |
| Jun. 14, 1991 | [JP] | Japan | 3-143208 |
| Jun. 14, 1991 | [JP] | Japan | 3-143209 |
| Jun. 14, 1991 | [JP] | Japan | 3-143210 |

[51] Int. Cl.$^5$ .............................................. G11B 15/46
[52] U.S. Cl. ................................ 360/73.05; 360/71; 360/73.04; 360/73.07; 360/73.08
[58] Field of Search .................... 360/71, 73.01, 73.04, 360/73.05, 73.06, 73.07, 73.08, 73.09, 73.11, 74.1, 81, 83, 84, 88, 90

[56] References Cited

U.S. PATENT DOCUMENTS

| 3,535,441 | 10/1970 | Grace | 178/6.6 |
| 4,104,685 | 8/1978 | Chang | 360/84 |
| 4,318,140 | 3/1982 | Shigeta | 360/73.08 |
| 4,341,363 | 7/1982 | Inatome | 242/189 |
| 4,807,107 | 2/1989 | Fincher | 364/148 |
| 4,945,426 | 7/1980 | Okamoto et al. | 360/73.11 |
| 5,032,936 | 7/1991 | Fujioka et al. | 360/71 |
| 5,150,263 | 9/1992 | Sakamoto | 360/69 |

FOREIGN PATENT DOCUMENTS 0107444 6/1984 Japan ................................ 360/73.04

Primary Examiner—Timothy P. Callahan
Assistant Examiner—Terry D. Cunningham
Attorney, Agent, or Firm—Robin, Blecker, Daley & Driscoll

[57] ABSTRACT

A tape drive controlling device includes a first controlling circuit for driving a take-up reel for a tape on the basis of the result of a comparison between a take-up-side tension measured between the take-up reel and a head and a predetermined tension target value, a second controlling circuit for driving a supply reel for the tape on the basis of the result of a comparison between a supply-side tension measured between the supply reel and the head and a predetermined tension target value, a speed detecting circuit for detecting the travel speed of the tape, and a correcting circuit for correcting at least one of the take-up-side and supply-side tension target values on the basis of the result of a comparison between a detection result provided by the speed detecting circuit and a travel speed target value.

30 Claims, 10 Drawing Sheets

TAPE DRIVE CONTROLLING DEVICE

BACKGROUND OF THE INVENTION

1. Field of the Invention

The present invention relates to a tape drive controlling device suitable for use in a magnetic-tape transporting system of, for example, a video tape recorder (hereinafter referred to as a "VTR").

2. Description of the Related Art

A magnetic recording and reproducing apparatus using a magnetic tape (hereinafter referred to as a "tape") which is one kind of electronic apparatus provided with such a controlling device, particularly a video tape recorder for business use which is called a "VTR", has conventionally been provided with a shuttle function, i.e., the function of feeding the tape at a high speed while reproducing recorded images one after another for the purposes of cueing or the like during editing.

A typical arrangement of the shuttle function is such that when the travel speed of the tape is to be changed, an operator turns a jog dial to change the travel speed of the tape step by step. In this arrangement and in general, in a low-speed range, the tape is fed by the rotation of a capstan with a pinch roller pressed in contact with the capstan, while, in a high-speed range, the tape is fed by reels with the pinch roller away from the capstan.

However, since the conventional example is arranged in the above-described manner, a number of problems arise. For example, when tape feed is to be switched from capstan feed to reel feed or vice versa in a high-speed travel mode, the operation of bringing the pinch roller into or out of contact with the capstan is needed. This operation hinders smooth change of tape travel speeds, and a considerably long time is taken until a desired speed is reached. Particularly during a transition from the reel feed to the capstan feed, the tape is nipped between the pinch roller and the capstan with the result that the tape feed must be temporarily stopped. This leads to the problem that an image reproducing operation is temporarily stopped.

Another problem may occur during the reversal of a tape travel. This problem will be described below with reference to FIG. 1.

In FIG. 1, a drum provided with a recording and reproducing head is denoted by reference numeral 1, a supply reel by reference numeral 2, a take-up reel by reference numeral 3, a magnetic tape by reference numeral 4, tension detectors for detecting the tension of the tape 4 by reference numerals 5 and 6, and a speed detector for detecting the travel speed of the tape 4 by reference numeral 18.

The magnetic tape 4 is fed from the supply reel 2 to the take-up reel 3 during fast forward feed. A supply-reel motor 17 and a take-up-reel motor 14 directly drive the supply reel 2 and the take-up reel 3, respectively.

The tensions of the tape 4 on a supply side and a take-up side are respectively detected by the tension detectors 5 and 6 and supplied to terminals a and b of the selecting switch 7. The selecting switch 7 is interlocked with selecting switches 10 and 11, and when the tape 4 is to be made to travel in the forward direction (when the tape 4 is to be fed from the supply reel 2 and wound around the take-up reel 3), the signal at the terminal a is selected, while when the tape 4 is to be made to travel in the opposite direction, i.e., in the rearward direction, the signal at the terminal b is selected.

The output from the selecting switch 7 is compared with a tension reference value 9 in a subtracter 8, and an error with the tension reference value 9 is supplied to the terminal b of the selecting switch 10 and to the terminal a of the selecting switch 11.

When the tape 4 is to be made to travel in the forward direction, the selecting switch 7 selects and outputs the signal at the terminal a, and the tension error signal from the subtracter 8 is inputted to a loop filter 15. When the tape 4 is to be made to travel in the rearward direction, the selecting switch 7 selects and outputs the signal at the terminal b, and this signal is inputted to a loop filter 12. Each of the loop filters 12 and 15 performs phase compensation and gain compensation to stabilize an associated servo loop. The outputs from the loop filters 12 and 15 are inputted to reel motor drivers 13 and 16, respectively, and the reel motors 14 and 17 are driven by the associated reel motor drivers 13 and 16.

The output from the speed detector 18 is compared with a speed reference value 20 in a subtracter 19, and the obtained speed error is supplied to the terminal a of the selecting switch 10 and to the terminal b of the selecting switch 11.

In the above-described arrangement, the supply reel 2 is controlled so that the tape tension on the supply side reaches the reference tension value, while the take-up reel 3 is controlled so that the tape 4 is made to travel at a reference speed. Accordingly, it is possible to feed the tape 4 at a desired speed by changing the speed reference value.

However, the above-described conventional example has a number of problems. For example, when the direction of tape feed is changed, a tension control loop and a speed control loop are switched between the supply side and the take-up side with the result that an abnormally high or low tension which may damage the tape is instantaneously applied to it. It has, therefore, been difficult to stabilize the tape tension and smoothly change the direction of tape feed.

SUMMARY OF THE INVENTION

It is, therefore, a primary object of the present invention to provide a tape drive controlling device which is capable of changing the travel speed of a tape smoothly and continuously without interruption of the reproduction of an image from a low-speed range to a high-speed range and which is arranged to prevent an abnormal tension from being applied to the tape during the reversal of tape travel.

To achieve the above object, in accordance with one aspect of the present invention, there is provided a tape drive controlling device comprising tape-travel-speed controlling means for changing the travel speed of a tape by means of the drive force of a reel motor throughout all travel speeds of the tape during a mode for changing the travel speed of the tape step by step from a low speed to a high speed.

In accordance with another aspect of the present invention, there is provided a tape drive controlling device comprising first controlling means for driving a take-up reel on the basis of the result of a comparison between a take-up-side tension measured between a head and the take-up reel for a tape kept in contact with the head and a predetermined tension target value, second controlling means for driving a supply reel for the tape on the basis of the result of a comparison between a supply-side tension measured between the supply reel and the head and a predetermined tension target value, detecting means for detecting the travel speed of the tape, and means for correcting at least one of the take-up-side and supply-side tension target values on the basis of the result of a comparison between a detection result provided by the detecting means and a travel speed target value.

A second object of the present invention is to provide a tape drive controlling device which can achieve the aforesaid primary object and also which is capable of holding a tension value obtained at a predetermined position at an optimum value.

To achieve the above object, in accordance with another aspect of the present invention, there is provided a tape drive controlling device comprising means for forming a tape path along which a tape is fed from a supply reel, wrapped around head means and wound around a take-up reel, tension controlling means for controlling tape tensions before and after the head means on the tape path, tape-travel-speed detecting means for detecting the travel speed of the tape, and correcting means for correcting the tape tensions before and after the head means by imparting weights to the respective tape tensions on the basis of an output from the tape-travel-speed detecting means.

A third object of the present invention is to provide a tape drive controlling device which can achieve the aforesaid primary object and also which is capable of minimizing the influence of a travel load even if the travel load increases.

To achieve the above object, in accordance with another aspect of the present invention, there is provided a tape drive controlling device comprising first controlling means for driving a take-up reel on the basis of the result of a comparison between a take-up-side tension measured between a head and the take-up reel for a tape kept in contact with the head and a predetermined tension target value, second controlling means for driving a supply reel for the tape on the basis of the result of a comparison between a supply-side tension measured between the supply reel and the head and a predetermined tension target value, detecting means for detecting the travel speed of the tape, means for correcting the take-up-side and supply-side tension target values on the basis of the result of a comparison between a detection result provided by the detecting means and a travel speed target value, and means for feeding an excess amount back to the other when one of the corrected take-up-side tension target value and the corrected supply-side tension target value exceeds a prescribed range.

A fourth object of the present invention is to provide a tape drive controlling device which can achieve the primary object and also which is capable of producing an optimum tape tension for each tape speed in the vicinity of a head.

To achieve the above object, in accordance with another aspect of the present invention, there is provided a tape drive controlling device comprising tension detecting means for detecting the tension of a tape on a predetermined travel path, speed detecting means for detecting the travel speed of the tape, tension controlling means for controlling the tension of the tape on the basis of a detected value provided by the tension detecting means, means for controlling the travel speed of the tape on the basis of a detected value provided by the speed detecting means, and means for switching target values of the tension controlling means in accordance with the travel speed of the tape.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Several embodiments of the present invention will be described hereinbelow.

First Embodiment

A first embodiment of the present invention will be described below with reference to the accompanying drawings.

Figure 2:
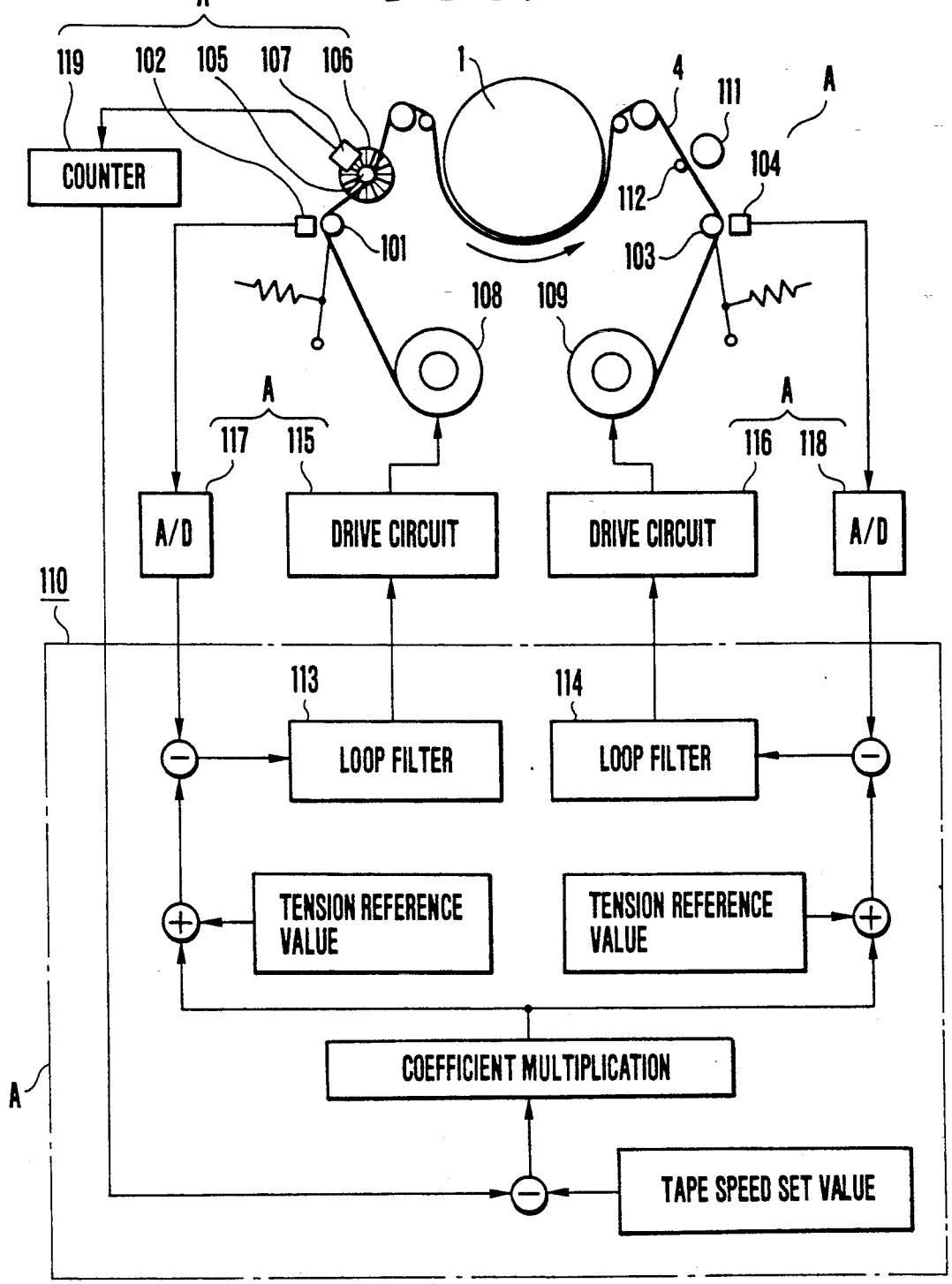
FIG. 2 is a diagrammatic explanatory view of a first embodiment of the present invention, showing its essential arrangement for controlling the travel speed and tension of a magnetic tape in a magnetic recording and reproducing apparatus.

FIG. 2 is a diagrammatic explanatory view of the first embodiment of the present invention, and shows its essential arrangement for controlling the travel speed and tension of a magnetic tape in a magnetic recording and reproducing apparatus.

The arrangement shown in FIG. 2 includes a supply-side tension post 101 for a magnetic tape (hereinafter referred to simply as a "tape") 4, a Hall element 102 for detecting the supply-side tension of the tape 4, a take-up-side tension post 103 for the tape 4, and a Hall element 104 for detecting the take-up-side tension of the tape 4. The Hall elements 102 and 104 output voltages corresponding to the supply-side and take-up-side tensions of the tape 4, respectively.

The arrangement also includes a tape-speed detecting roller (hereinafter referred to as a "roller") 105, and a disc 106 having a plurality of slits secured to the top of the tape-speed detecting roller 105. As the tape 4 travels, the disc 106 rotates integrally with the roller 105. The arrangement also includes an opposed type of photointerrupter 107 consisting of a light emitting element and a light receiving element (neither of which is shown). The photointerrupter 107 is disposed in such a manner that the disc 106 is positioned between the light emitting element and the light receiving element. During the rotation of the disc 106, light from the light emitting element is allowed to illuminate the light receiving element through the slits, and the light receiving element outputs a rectangular wave.

The arrangement also includes a supply reel 108 for the tape 4 and a take-up reel 109 for the tape 4, which are driven by their respective reel motors (not shown), a CPU (central processing unit) 110 for controlling the travel speed and tension of the tape 4, a pinch roller 111, a capstan 112, loop filters 113 and 114 disposed, respectively, on the supply side and the take-up side, and drive circuits 115 and 116 for driving the associated reel motors. A tape-travel-speed controlling means A is constituted by the Hall elements 102 and 104, the roller 105, the disc 106, the photointerrupter 107, the CPU 110, the drive circuits 115 and 116, A/D converters 117 and 118, and a counter 119. Although not shown, a high-speed travel mode key which is called a "shuttle key" is also provided separately from ordinary operating keys such as a reproduce key, a fast forward key and a rewind key.

Figure 3:
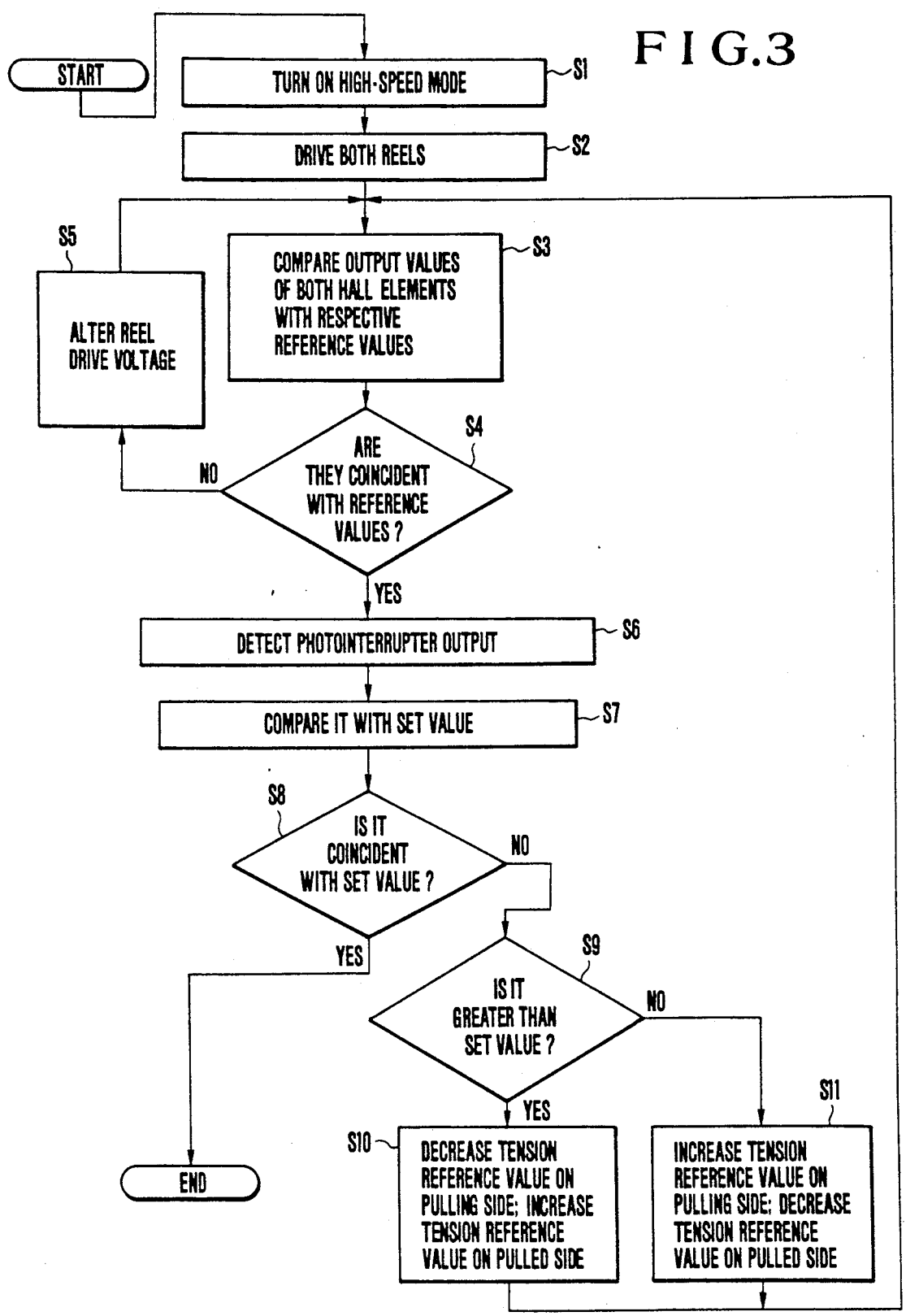
FIG. 3 is a flowchart showing control over the travel speed and tension of the magnetic tape in the first embodiment.

The operation of the above-described arrangement will be described below with reference to the flowchart of FIG. 3.

When the high-speed travel mode key is turned on in Step S1 to initiate cueing of an image to be reproduced for the purposes of editing or the like, the pinch roller 111 is made to move away from the capstan 112 to bring the tape 4 to a stop, whereby a high-speed travel mode is selected. Then, when an operator turns a jog dial (not shown) to set a desired speed, the reel motors (not shown) for driving the respective reels 108 and 109 are driven in Step S2 to cause the tape 4 to initiate travelling. In Step S3, tension reference values corresponding to the set desired speed, which are respectively set on the supply and take-up sides of the tape 4, are compared with digital values which are obtained by applying the outputs from the respective Hall elements 102 and 104 to the corresponding A/D converters 117 and 118 and converting the outputs into a digital form by the A/D converters 117 and 118. Then, if the CPU 110 determines in Step S4 that there are errors between the tension reference value and the output value of the Hall element 102 and between the tension reference value and the output value of the Hall element 104, the errors are outputted to the associated loop filters 113 and 114 and the outputs of the loop filters 113 and 114 are inputted to the respective drive circuits 115 and 116. In Step S5, the drive voltages of the respective reel motors are changed. If the tensions on both sides become equal to the respective tension reference values, a tape speed output value from the photointerrupter 107 is detected in Step S6 and is compared with the set speed value in Step S7. In Step S8, it is determined whether the tape speed output value coincides with the set speed value. If an error is detected in Step S8, the process proceeds to Step. S9, where the error is distributed to both sides through a coefficient multiplication and the tension reference values on both sides are altered.

If it is determined in Step S9 that the tape speed is greater than the set speed value, the process proceeds to Step S10, where the tension reference value on a pulling side, i.e., the take-up side during a forward tape travel or the supply side during a rearward tape travel, is made small, while the tension reference value on a pulled side is made large. Subsequently, the tension reference values are again compared with the output values of the Hall elements 102 and 104, respectively. On the pulling side, since the tension reference value is smaller than the output value from a corresponding one of the Hall elements 102 and 104, the drive voltage of the associated reel motor is decreased, while the drive voltage of the reel motor on the pulled side is increased. Thus, the tape speed is decreased. If it is determined in Step S9 that the tape speed is smaller than the set speed value, the process proceeds to Step S11, where the tape speed is increased through a process inverse to the aforesaid process, and the thus-varied speed value is again compared with the set speed value.

In the above-described manner, the comparison between the tape speed and the set speed value as well as alteration of the tension reference values is repeated until the tape speed reaches the set speed value. Thus, the tape speed is adjusted to the set speed value and the tape 4 is made to travel at that speed with an image reproduced. When the operator further turns the jog dial to change the set speed value, the tension reference values and the tape speed set value within the CPU 110 are altered to values corresponding to the set speed value, respectively, so that the tape speed changes. Thus, the tape speed is controlled by the tape-travel-speed controlling means A throughout the entire range from a low-speed range to a high-speed range, whereby the tape 4 is made to travel at the desired tape travel speed with a recorded image reproduced. If an image reproducing operation in the high-speed travel mode needed for editing or the like is completed, the operator turns off the shuttle key (not shown) to return the mode of operation to a normal recording/reproduction mode.

As described above, it is not necessary to perform switching between capstan drive and reel drive during the travel of the tape 4 in changing the travel speed of the tape 4 step by step from the high-speed range to the low-speed range with an image reproduced. Accordingly, it is possible to always perform smooth tape feed at a desired tape travel speed while reproducing an image, whereby cueing or other operations during editing can be efficiently performed.

As is apparent from the foregoing description, in accordance with the first embodiment, in changing the travel speed of a magnetic tape step by step from the high-speed range to the low-speed range with an image reproduced during editing or the like, control over the travel speed of the magnetic tape can be realized by the driving of the reel motors throughout the overall range from the low-speed range to the high-speed range by means of the tape-travel-speed controlling means. Accordingly, a temporary stop of the magnetic tape is eliminated which is caused by the switching from capstan feed to reel feed which has conventionally been required to shift the tape travel speed from the low-speed range to the high-speed range. Accordingly, since it is possible to smoothly change the tape travel speed to a desired one with a recorded image reproduced, the tape travel speed in the high-speed travel mode such as the cueing of the magnetic tape during editing can be arbitrarily changed without interrupting image reproduction, whereby editing, review of a recorded image, or the like, can be efficiently carried out.

Second Embodiment

A second embodiment of the present invention will be described in detail below with reference to the accompanying drawings.

Figure 4:
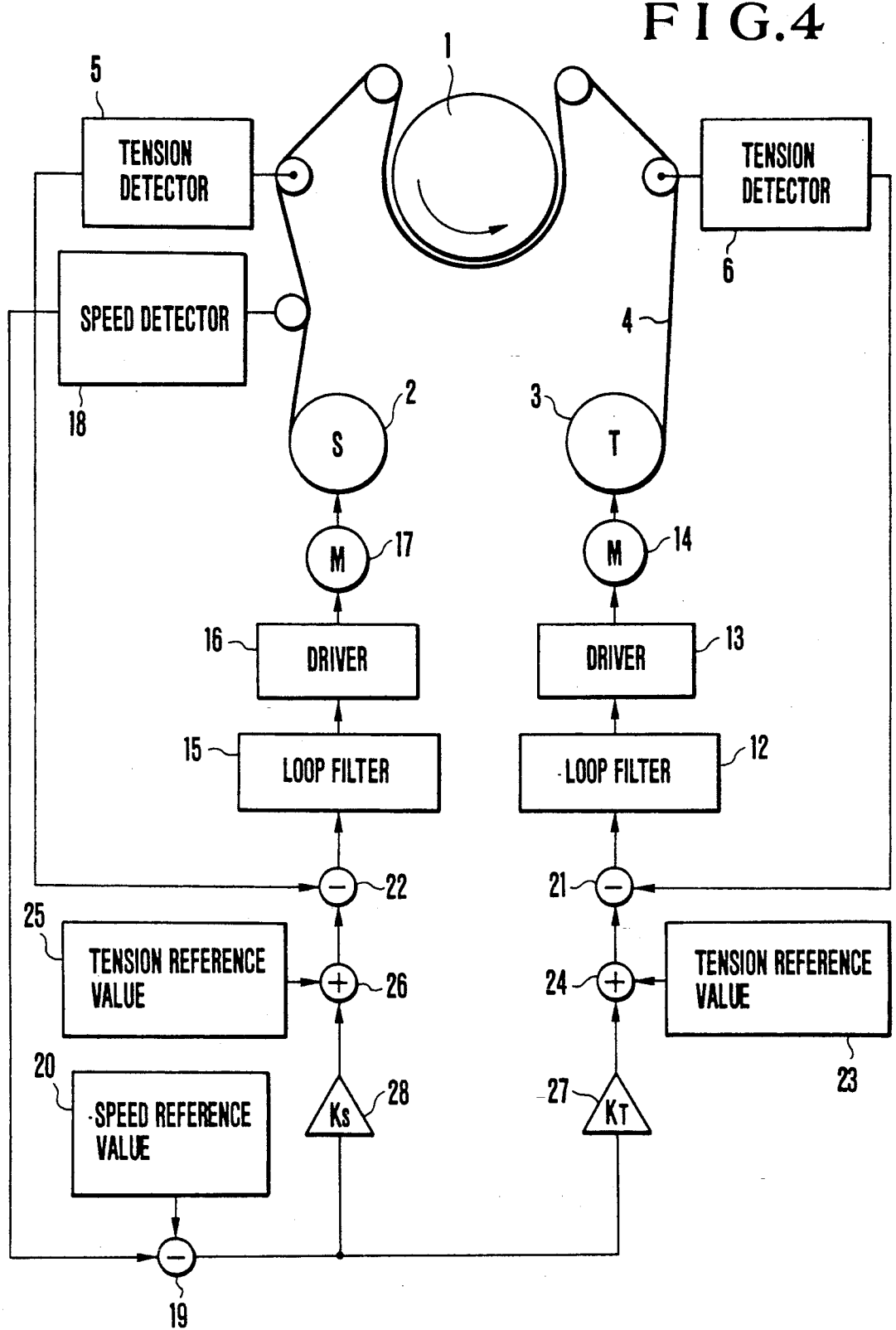
FIG. 4 is a view diagrammatically showing the arrangement of a tape drive controlling device according to a second embodiment of the present invention.

FIG. 4 is a diagrammatic view of the arrangement of the second embodiment.

Figure 1:
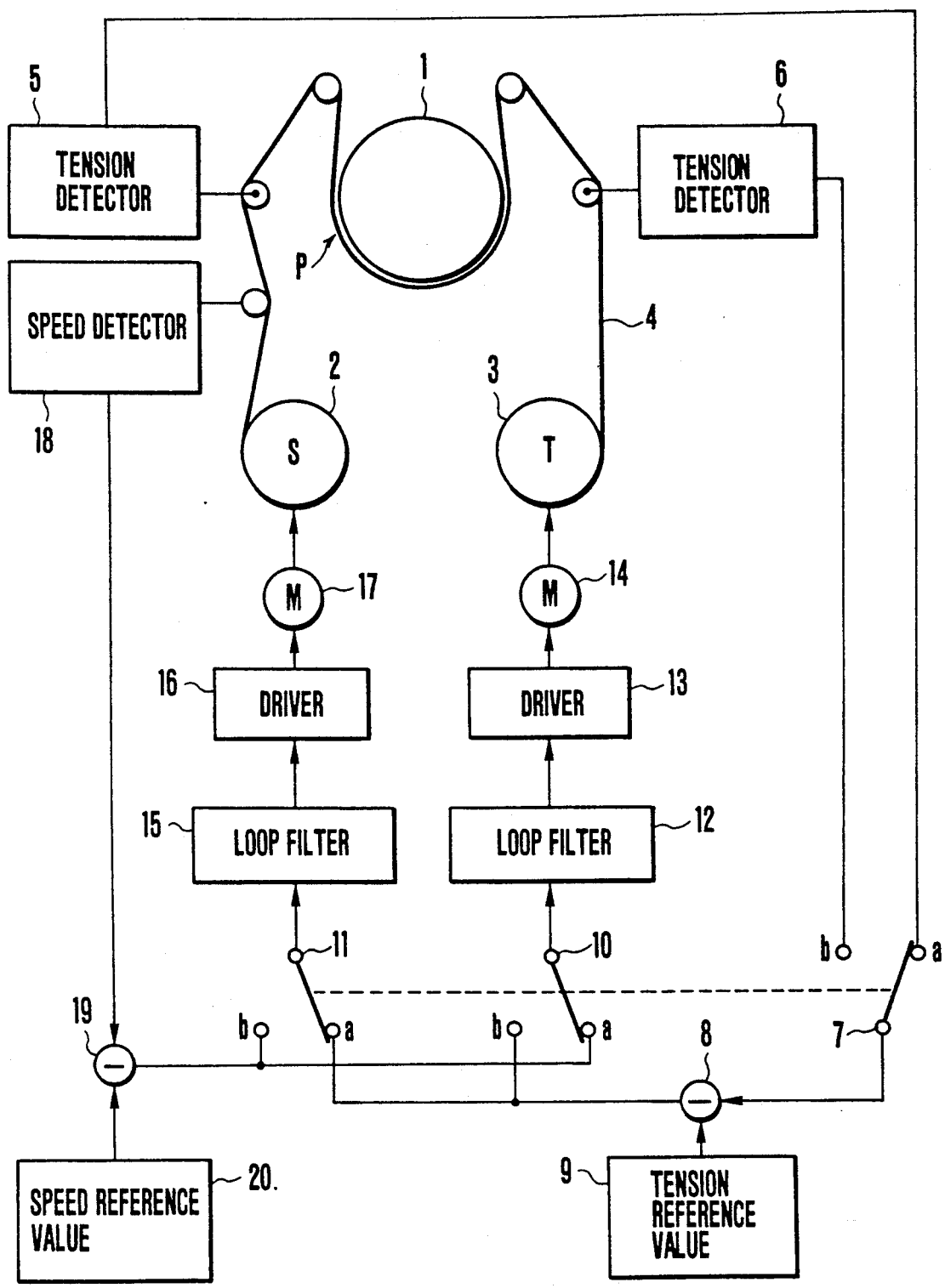
FIG. 1 is a view diagrammatically showing the arrangement of a conventional tape drive controlling device.

In FIG. 4, identical reference numerals are used to denote parts which are substantially identical to those used in the conventional example of FIG. 1.

Referring to FIG. 4, coefficient multipliers 27 and 28 multiply tape-travel-speed error signals from a subtracter 19 by the coefficients kT and ks, respectively. Adders 24 and 26 correct tension reference values 23 and 25 on the basis of the tape-travel-speed error signals multiplied by the coefficients kT and ks, respectively.

The coefficients kT and ks of the coefficient multipliers 27 and 28 are set to appropriate values in accordance with the state of the tape 4 such as the direction and speed of tape travel. A case where the tape 4 is fed in the forward direction will be considered. If the tape travel speed is lower than a tape speed reference value 20 which is a target value, the value of the coefficient kT of the coefficient multiplier 27 is set so that the tension reference value 23 is corrected to be a high value by the adder 24. The value of the coefficient ks of the coefficient multiplier 28 is set so that the tension reference value 25 is corrected to be a low value by the adder 26.

The tension reference values 23 and 25 which have been corrected in the above-described manner are independently outputted from subtracters 21 and 22 to a supply side and a take-up side as tension error signals. Subsequently, control is carried out in a manner similar to that of the device of FIG. 1. Although in the device of FIG. 1 tension control is carried out on only the supply side of the tape 4, the second embodiment is arranged so that tension control is independently carried out on both supply and take-up sides.

Accordingly, the supply-side tension and the take-up side tension are controlled at all times so that the tape can be made to travel at a constant speed by controlling the tension difference between a supply reel 2 and a take-up reel 3 by using a speed error signal. To change the direction of tape travel, it suffices to control the tension difference between the supply reel 2 and the take-up reel 3 to reverse the relation between the high value and the low value. This control is realized by controlling the tension reference values 23 and 25 and the coefficient values of the coefficient multipliers 27 and 28.

As is apparent from the above description, according to the second embodiment, it is possible to smoothly and stably control the tape 4 even when the direction of tape feed is changed.

Although the above-described correction is carried out on both supply and take-up sides, such correction may be performed on either side.

An arrangement for carrying out the correction on either side will be described below with reference to FIG. 4 in conjunction with an example in which the correction is performed on the take-up side.

In this arrangement, the adder 26 and the coefficient multiplier 28 are omitted, and the tension reference value 25 is inputted directly to the subtracter 22.

The coefficient kT Of the coefficient multiplier 27 is set to an appropriate value in accordance with the state of the tape 4 such as the direction and speed of tape travel. A case where the tape 4 is fed in the forward direction will be considered. If the tape travel speed is lower than the tape speed reference value 20 which is a target value, the value of the coefficient kT of the coefficient multiplier 27 is set so that the tension reference value 23 is corrected to be a high value by the adder 24.

The tension reference value 25 is previously set to an optimum value for the mode of operation, and is not corrected by a speed error signal.

The tension reference value 23 which has been thus corrected by the speed error signal and the tension reference value 25 which has not been corrected are independently outputted from the subtracters 21 and 22 to the supply side and the take-up side as tension error signals. Subsequently, control is carried out in a manner similar to that of the device of FIG. 1. Although in the device of FIG. 1 tension control is carried out on only the supply side of the tape 4, this example is arranged so that tension control is independently carried out on both supply and take-up sides.

Accordingly, the supply-side tension is at all times controlled to be an optimum value for the mode of operation, and the take-up-side tension is controlled by changing the tension difference between the supply side and the take-up side so as to cause the tape 4 to travel at a set speed. To change the direction of tape travel, it suffices to control the tension difference between the supply reel 2 and the take-up reel 3 to reverse the relation between the high value and the low value. This control is realized by controlling the tension reference values 23 and 25 and the polarity of the coefficient multiplier 27.

Third Embodiment

A third embodiment of the present invention will be described below with reference to FIG. 5.

Figure 5:
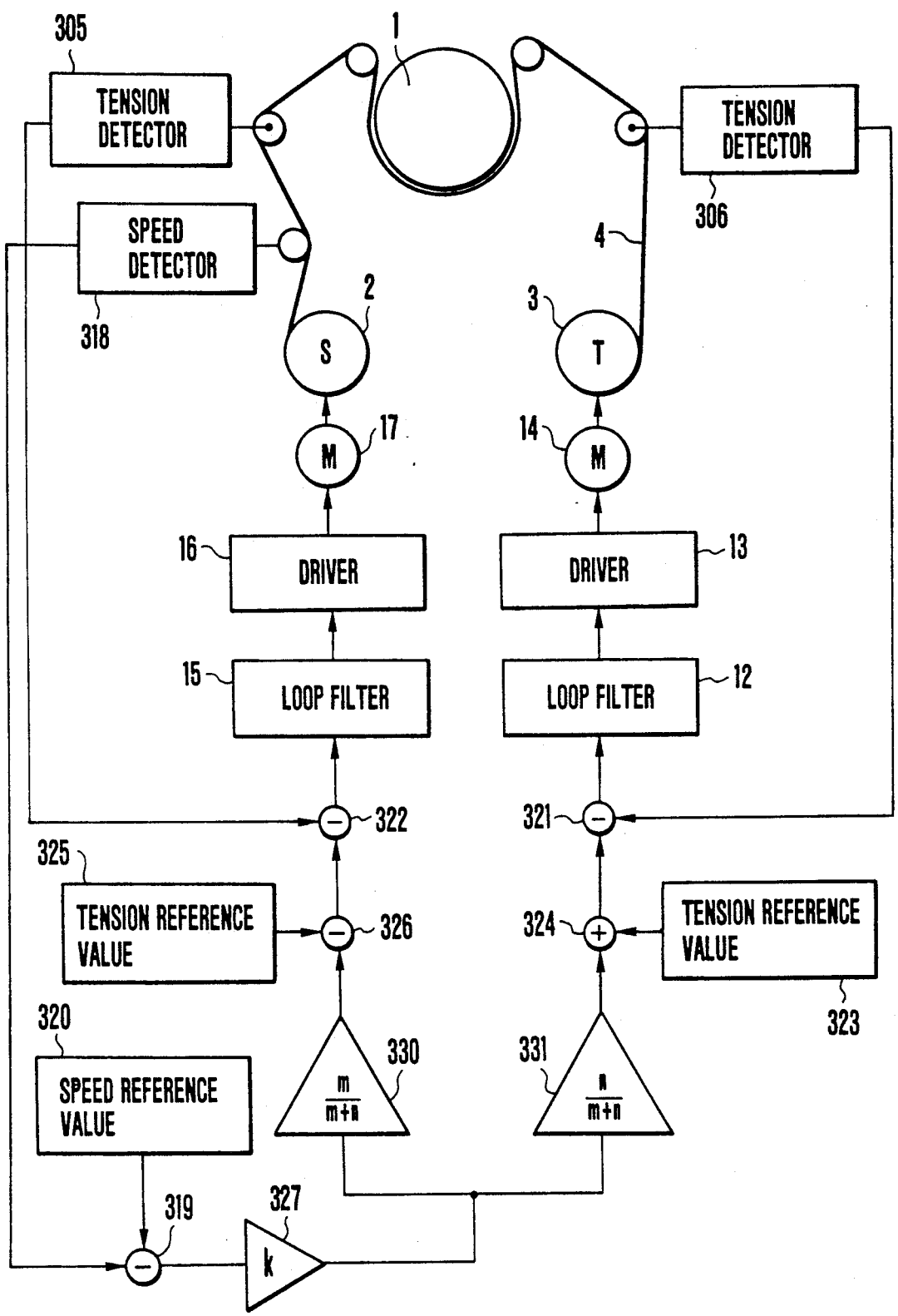
FIG. 5 is a view diagrammatically showing the arrangement of a tape drive controlling device according to a third embodiment of the present invention.

FIG. 5 is a diagrammatic mechanism view representing the most distinctive feature of fast forward feed in the third embodiment.

In FIG. 5, identical reference numerals are used to denote elements which are substantially identical to those used in the conventional example of FIG. 1, and description is omitted.

Referring to FIG. 5, coefficient multipliers 330 and 331 serve to distribute and supply a value obtained by multiplying a tape-travel-speed error signal by a predetermined coefficient in a coefficient multiplier 327 to a supply-side tension control system and to a take-up-side tension control system at a predetermined distribution ratio of n:m, the tape-travel-speed error signal being obtained by comparing tape speed information outputted from a tape-travel-speed detector 318 with a speed reference value 320 in a subtracter 319. Arithmetic units 324 and 326 perform addition and subtraction, respectively, and the arithmetic unit 326 applies correction using subtraction to a supply-side tension reference value 325 on the basis of either of the distributed signals, while the arithmetic unit 324 applies correction using addition to a take-up-side tension reference value 323 on the basis of the other. The aforesaid relation in which the addition is performed on the supply side and the subtraction on the take-up side is inverted during tape rewinding. A switching operation for inverting such a relation and control over the direction of tape travel are carried out by a system controller circuit (not shown).

The operation of tape speed control will be described below with reference to FIG. 5.

The output from the tape speed detector 318 is compared with the speed reference value (speed target value) 320 by the subtracter 319, which in turn outputs a speed error signal. The speed error signal is multiplied by the conversion coefficient k in the coefficient multiplier 327, and the result is supplied to the coefficient multiplier 330 on the supply side and to the coefficient multiplier 331 on the take-up side. The coefficient multipliers 330 and 331 multiply the respective inputs by the weights $$\frac{m}{m+n} \text{ and } \frac{n}{m+n},$$

whereby the tape-travel-speed error signal is distributed at a ratio of m:n between the supply side and the take-up side. The supply-side tension reference value 325 is corrected by the subtracter 326 on the basis of one of the distributed tape speed error signals, while the take-up-side tension reference value 323 is corrected by the adder 324 on the basis of the other of the distributed tape speed error signals.

For example, if the speed of tape travel is lower than the tape speed reference value 320 which is a target value, the tape-travel-speed error signal is produced through the subtracter 319 and the coefficient multiplier 327. The tape-travel-speed error signal is distributed at the ratio of m:n by the coefficient multipliers 330 and 331 and, on the basis of the signals of m:n, the supply-side tension reference value 325 and the take-up-side tension reference value 323 are set to low and high values by the arithmetic units 326 and 324, respectively. That is to say, the difference between take-up-side tension and supply-side tension is increased and the speed of tape travel is increased.

The tension reference values 325 and 323 which have been corrected by the arithmetic units 326 and 324 are inputted to the subtracters 322 and 321, respectively, where they are compared with tension values detected by associated tension detectors 305 and 306.

A method of determining the distribution ratio of m:n for distributing the tape-travel-speed error signal will be described below.

In general, to achieve a stable head touch in a VTR, it is necessary to stabilize tape tension in the vicinity of a drum. In a predetermined tape path, if $\phi 1$ is a travel load occurring along a tape path extending from the tension detector 305 on the supply side to a drum 1, $\phi 2$ is a travel load occurring along a tape path extending from the drum 1 to the tension detector 306 on the take-up side, Ts is a tape tension detected by the tension detector 305 on the supply side, TD is a tape tension occurring around the drum 1, and TT is a tape tension detected by the tension detector 306 on the take-up side, the following relation is established:

$$TD/TS = \phi 1, \ TT/TD = \phi 2$$

Therefore, the variance of the tension TD around the drum 1 according to the variations of the tape tensions TS and TT at the respective tension detectors 305 and 306 is as follows:

$$\Delta T_D = \phi_1 \Delta T_S, \ \Delta T_D = \frac{1}{\phi_2} \Delta T_T$$

The variances $\Delta TS$ and $\Delta TT$ of the tape tension at the respective tension detectors 305 and 306 are changed under speed control at the ratio of m:n; thus $$\Delta T_S = \frac{m}{m+n} \Delta V, \ \Delta T_T = -\frac{n}{m+n} \Delta V$$

where $\Delta V$ is the variance of tape speed.

Therefore, the variance of tape tension around the drum 1 is:

$$\Delta T_D = \phi_1 \Delta T_S + \frac{1}{\phi_2} \Delta T_T = \frac{\Delta V}{m+n} \left( m\phi_1 - \frac{n}{\phi_2} \right)$$

If zero is placed in the term $\Delta TD$ ($\Delta TD=0$), m:n is determined as follows:

$$m:n = \frac{1}{\phi_2} : \phi_1$$

Figure 6A:
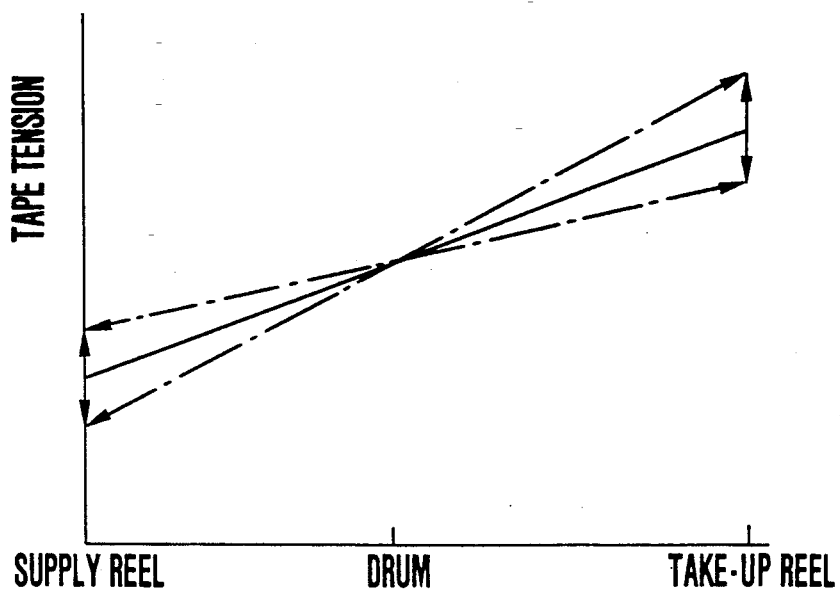
FIGS. 6(a) and 6(b) are graphic representations showing load variations in the third embodiment.
Figure 6B:
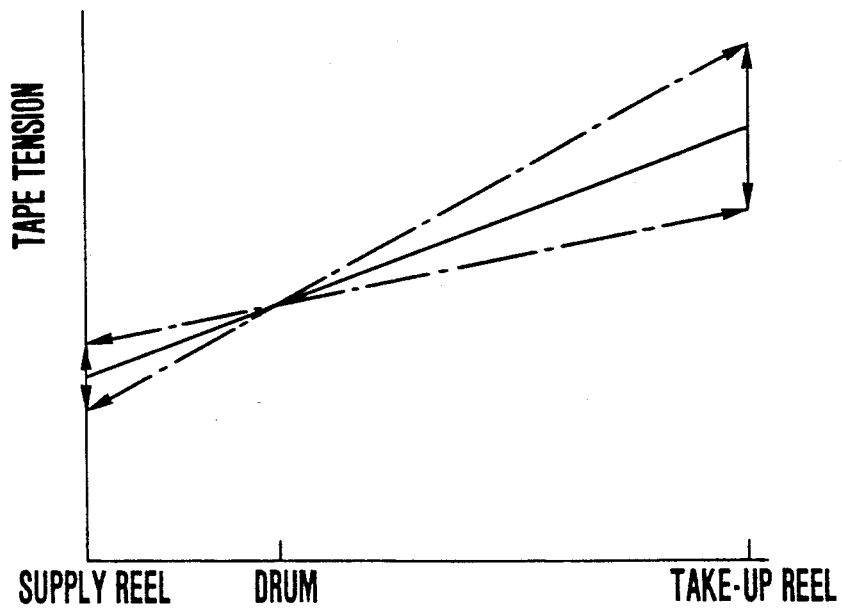

Each of FIGS. 6(a) and 6(b) is a graphic representation showing a practical example of a variation occurring in tape tension around a drum when tape tension is varied under tape speed control, and shows the relation between the tape tension and a tape travel path. The horizontal axis represents the tape travel path and the vertical axis a tape tension value. FIG. 6(a) shows a case where the drum is positioned approximately in the middle of the tape path (the tape path is a target system and $\phi 1:\phi 2=1:1$ (so-called M loading system)), and FIG. 6(b) shows a case where the drum is positioned nearer to a supply reel on the supply side of the tape path ($\phi 1:\phi 2=1:4$ (so-called U loading system)). The coefficients m and n are set in accordance with the ratio of tape travel loads before and after the drum, that is, m:n=1:1 for FIG. 6(a) and m:n=1:4 for FIG. 6(b). By carrying out such selection, it is possible to prevent tape tension from varying in the vicinity of the drum even if a variation occurs in the tension reference value at either of the tension detectors, whereby it is possible to achieve a constantly stable tape travel.

As described above, in the third embodiment, the tape-travel-speed error signal is distributed at a predetermined ratio and the distributed signals are added to or subtracted from the respective tape tension values by the associated arithmetic units. Accordingly, even if tape speed control is performed by manipulating the tape tension values, it is possible to achieve a stable head touch without varying tape tension in the vicinity of the drum.

Fourth Embodiment

A fourth embodiment of the present invention will be described in detail below with reference to associated drawings.

Figure 7:
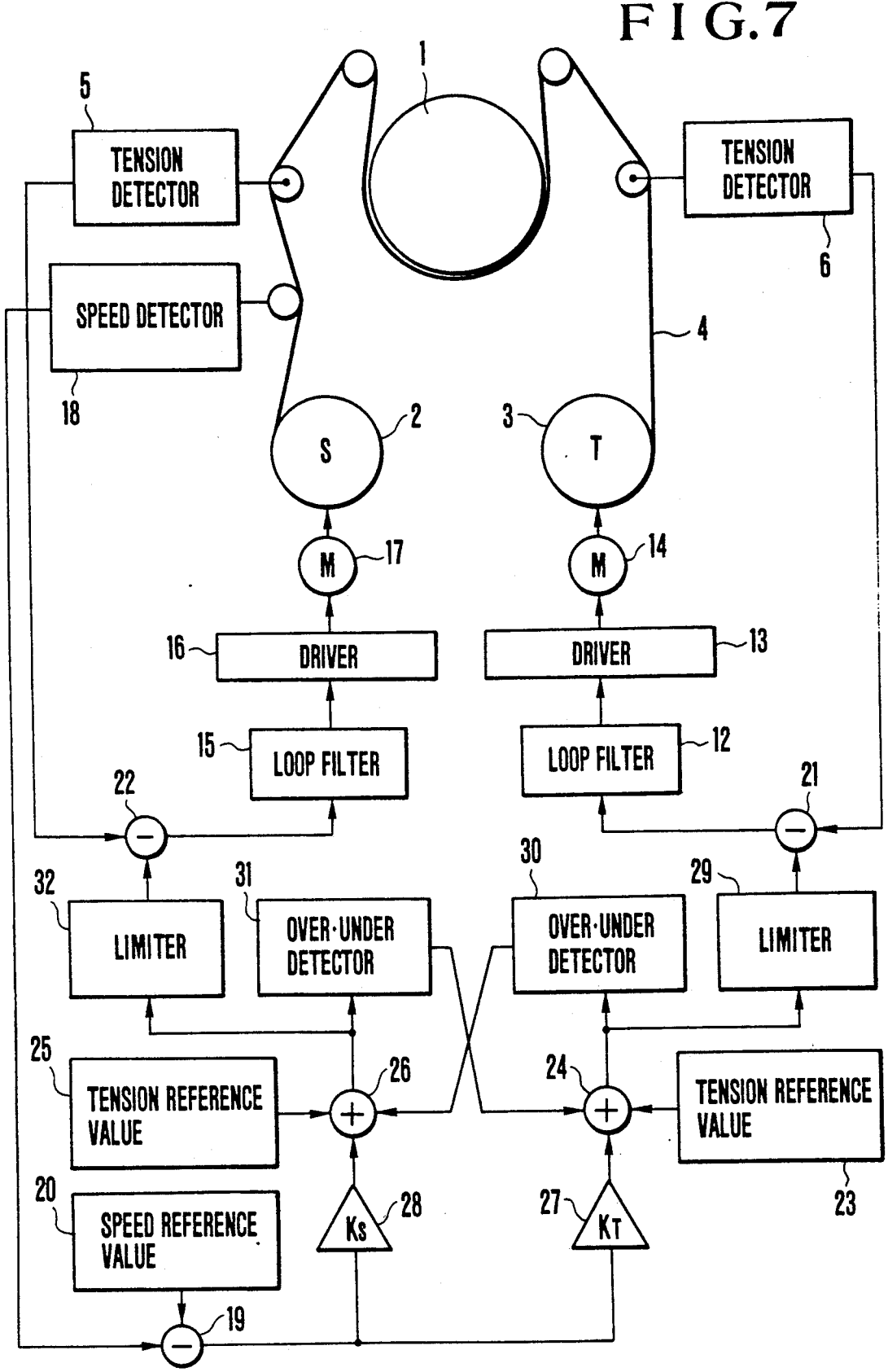
FIG. 7 is a view diagrammatically showing the arrangement of a tape drive controlling device according to a fourth embodiment of the present invention.

FIG. 7 is a diagrammatic view of the arrangement of the fourth embodiment. In FIG. 7, identical reference numerals are used to denote parts which are substantially identical to those used in the conventional example of FIG. 1.

Referring to FIG. 7, the coefficient multipliers 27 and 28 multiply tape-travel-speed error signals from the subtracter 19 by the coefficients kT and ks, respectively, and output the results to the adders 24 and 26.

The coefficients kT and ks of the coefficient multipliers 27 and 28 are set to appropriate values in accordance with the state of the tape 4 such as the direction and speed of tape travel. A case where the tape 4 is fed in the forward direction will be considered. If the tape travel speed is lower than the tape speed reference value 20 which is a target value, the value of the coefficient kT of the coefficient multiplier 27 is set so that the tension reference value 23 is corrected to be a high value by the adder 24. The value of the coefficient ks of the coefficient multiplier 28 is set so that the tension reference value 25 is corrected to be a low value by the adder 26. Limiter circuits 29 and 32 each have the input-output characteristics of FIG. 8(a), while over.under detectors 30 and 31 each have the input-output characteristics of FIG. 8(b). The adder 24 sums the output of the coefficient multiplier 27, the output of the tension reference value 23 and the output of the over.under detector 31, and outputs the result to each of the over.under detector 30 and the limiter 29. The adder 26, which is similar to the adder 24, sums the output of the coefficient multiplier 28, the output of the tension reference value 25 and the output of the over.under detector 30, and outputs the result to each of the over.under detector 31 and the limiter 32.

Figure 8A:
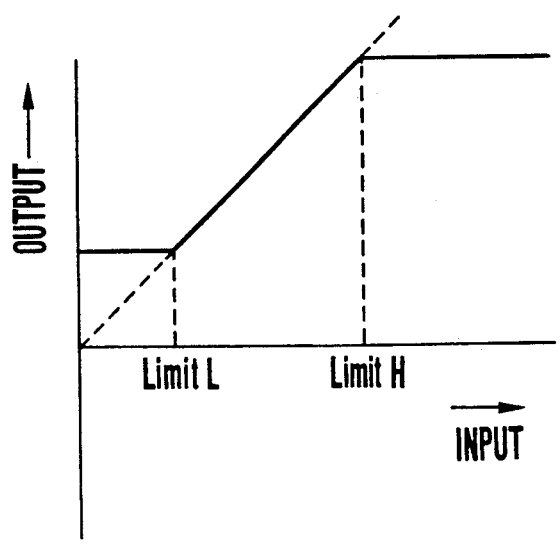
FIG. 8(a) is a graphic representation showing the input-output characteristics of a limiter in the fourth embodiment.

The output of the adder 24, i.e., a tension target value on the take-up side (T side), is limited within an appropriate target value by the limiter 29. This operation is realized by the input-output characteristics of FIG. 8(a). In FIG. 8(a), if a value lower than Limit L is inputted to the limiter 29, a value corresponding to the value of Limit L is outputted. If a value higher than Limit H is inputted to the limiter 29, a value corresponding to the value of Limit H is outputted.

The output of the adder 24 is inputted to the over.under detector 30, where a value which has become unable to be corrected in the take-up-side tension system is found. The result is inputted to the adder 26 on the supply side (S side) to correct a tension target value on the supply side. The over.under detector 30 which has the input-output characteristics of FIG. 8(b) can find a value corresponding to the value limited by the limiter 29.

Figure 8B:
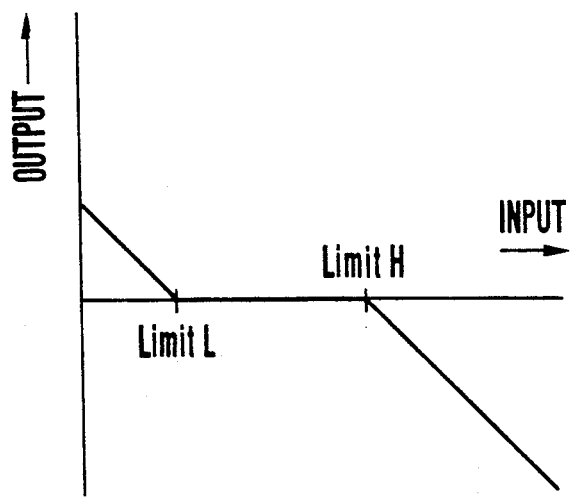
FIG. 8(b) is a graphic representation showing the input-output characteristics of an over.under detector in the fourth embodiment.

In FIGS. 8(a) and 8(b), Limit L indicates the lower limit of the tension target value and Limit H indicates the upper limit of the same. It is likely that slacked tape loading or unstable head touch will occur at a tension below Limit L, while it is likely that tape damage or head damage due to the tight winding of tape on the drum may occur at a tension above Limit H.

Although the take-up-side control system has been described above, substantially identical control is carried out on the supply side as well. In this case, the adder 24 on the take-up side corresponds to the adder 26 on the supply side, the limiter 29 corresponds to the limiter 32, and the over.under detector 30 corresponds to the over.under detector 31. It is to be noted that the values of Limit L and Limit H can be set independently on each of the take-up side and the supply side. This is because the take-up side and the supply side differ from each other in tension-setting range owing to various conditions such as the difference in mechanical position between tension detecting portions, the direction of tape travel and the direction of drum rotation.

The tension reference values which have been corrected in the above-described manner are outputted from the subtracters 21 and 22 to the supply side and the take-up side as tension error signals. Subsequently, control is carried out in a manner similar to that of the device of FIG. 1. Although in the device of FIG. 1 tension control is carried out on only the supply side of the tape 4, the device of FIG. 7 is arranged so that tension control is carried out on both supply and take-up sides.

Accordingly, the supply-side tension and the take-up-side tension are controlled at all times so that the tape can be made to travel at a constant speed by controlling the tension difference between the supply reel and the take-up reel by using a speed error signal. To change the direction of tape travel, it suffices to control the tension difference between the supply reel and the take-up reel to reverse the relation between the high value and the low value. This control is realized by controlling the tension reference values 23 and 25 and the coefficient values of the coefficient multipliers 27 and 28.

Although not shown, it is a matter of course that the output values of the adders 24 and 26 which serve as tension target values are limited within such a safe range that does not cause tape damage.

In the above-described operation, if it is impossible to control the tape to travel at a set speed within an optimum tension range on the take-up side, an excess amount is fed back to the tension target value on the supply side, thereby enabling the tape to travel. If it is impossible to control the tape to travel at a set speed within an optimum tension range on the supply side, an excess amount is fed back to the tension target value on the take-up side, thereby enabling the tape to travel. Accordingly, it is possible to provide control by fully utilizing the tension difference between the supply side and the take-up side.

As described above, in accordance with the fourth embodiment, it is possible to minimize the influence of an increase of travel load such as humidity and temperature or an increase of load due to the nonuniformity of the quality of cassette tape, whereby it is possible to achieve travel control without damaging the tape.

Fifth Embodiment

A fifth embodiment of the present invention will be described below with reference to FIG. 9.

Figure 9:
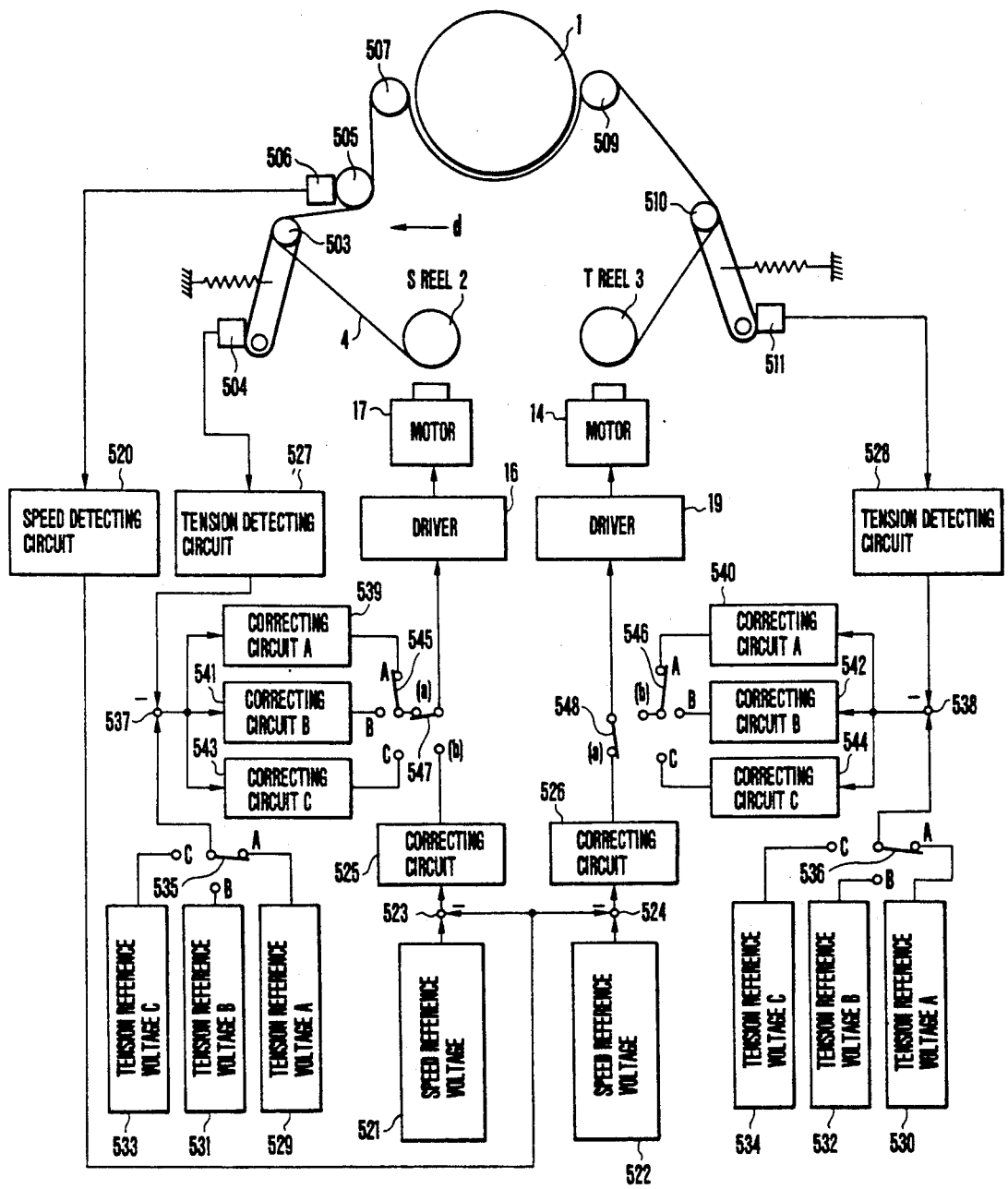
FIG. 9 is a view diagrammatically showing the arrangement of a tape drive controlling device according to a fifth embodiment of the present invention; and ·

The arrangement of FIG. 9 includes a tension detecting arm 503 for converting a tape tension into its movement and detecting the tape tension, a tension detecting sensor 504 for converting the movement of the tension detecting arm 503 into a voltage, a tape-travel-speed detecting guide roller 505 for converting a tape travel speed into its rate of rotation, a tape speed detecting sensor 506 for detecting the rate of rotation of the tape-travel-speed detecting guide roller 505 as a pulse signal, tape guides 507 and 509, a tension detecting arm 510 similar to the tension detecting arm 503, a tension detecting sensor 511 similar to the tension detecting sensor 504, a speed detecting circuit 520 for performing frequency-to-voltage (FV) conversion of the period of the pulse signal detected by the tape speed detecting sensor 506 and outputting a voltage corresponding to the tape speed, speed-reference-voltage generating circuits 521 and 522 for respectively generating voltages corresponding to the target value of a tape travel speed to be controlled, comparators 523 and 524 for respectively comparing the voltages generated by the speed-reference-voltage generating circuits 521 and 522 with a voltage corresponding to an actual tape speed detected by the speed detecting circuit 520 to thereby generate error signals, correcting circuits 525 and 526 for respectively converting the error signals into stable control signals, tension detecting circuits 527 and 528 for respectively converting the aforesaid voltages detected as the movement of the tension detecting arms 503 and 510 into voltages corresponding to the tension values, tension-reference-voltage generating circuits 529, 531 and 533 for respectively generating constant voltages corresponding to optimum tape tension values for various tape speeds in the state of forward tape feed, tension-reference-voltage generating circuits 530, 532 and 534 for respectively generating constant voltages corresponding to optimum tape tension values for various tape speeds in the state of rearward tape feed, selecting switches 535 and 536 each of which is selectively connected to a terminal A, B or C in accordance with a selected tape speed, a comparator 537 for comparing the constant voltage generated by any one of the tension-reference-voltage generating circuits 529, 531 and 533 with the actual tape tension and generating an error signal based on the obtained difference, a comparator 538 for comparing the constant voltage generated by any one of the tension-reference-voltage generating circuits 530, 532 and 534 with the actual tape tension and generating an error signal based on the obtained difference, correcting circuits 539, 541 and 543 for converting the error signal into the most stable control signal for each of the various tape speeds in the state of forward tape feed, correcting circuits 540, 542 and 544 for converting the error signal into the most stable control signal for each of the various tape speeds in the state of rearward tape feed, selecting switches 545 and 546 which are selectively switched according to each of the various tape speeds in association with the switches 535 and 536, and selecting switches 547 and 548 which are switched according to whether the forward tape feed or the rearward tape feed is selected. Each of the selecting switches 547 and 548 selects a contact (a) in the case of the forward tape feed, and a contact (b) in the case of the rearward tape feed.

A method of controlling tape travel will be described below.

The magnetic tape 4 is fed from the supply reel 2, and guided toward the tension detecting arm 503. Tape tension at this position is converted into a corresponding electrical signal, that is, a voltage corresponding to the tension, via the tension detecting arm 503, the tension detecting sensor 504 and the tension detecting circuit 527.

Figure 10:
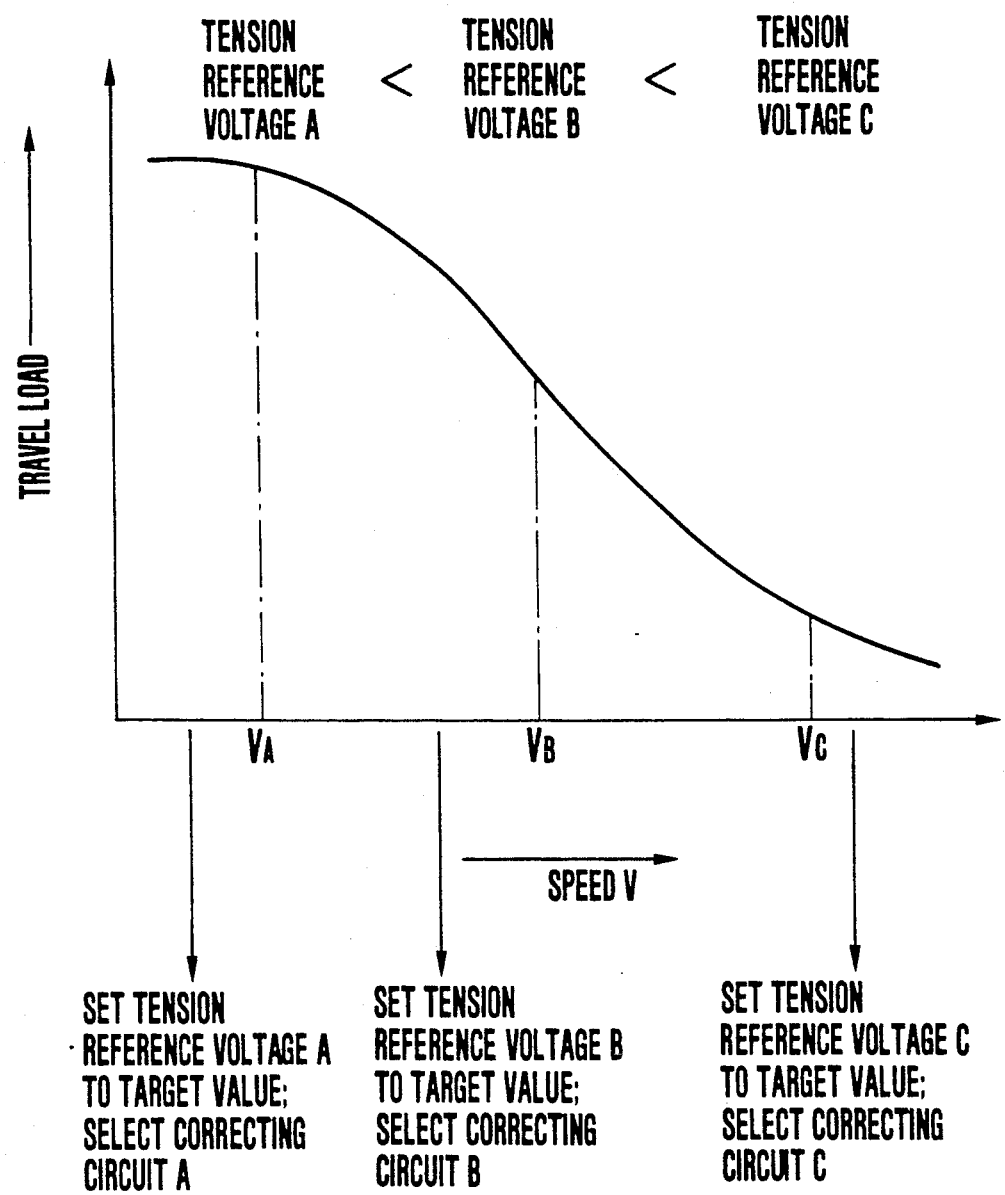
FIG. 10 is a graphic representation showing the relation between a tape feed speed and a tape travel load in the fifth embodiment.

In the meantime, as shown in FIG. 10, the tension reference voltage generating circuit 529 generates a reference voltage corresponding to a tension target value which becomes an optimum tape tension at a tape-tension-detecting arm position (the position shown at d in FIG. 9) when a tape speed V is V<VA. Similarly, the tension reference voltage generating circuits 531 and 533 generate optimum reference voltages for VA<V<Vc and Vc<V, respectively. Incidentally, a circuit arrangement may be added which divides the zone between the tape speeds VA and Vc into a plurality of tape speed ranges on the basis of, for example, a tape speed VB and generates reference voltages corresponding to tape tension target values optimum for the respective tape speed ranges obtained by such division. The switch 535 is selectively switched in accordance with the tape speed V to select a reference voltage corresponding to a tension target value which corresponds to any one of the aforesaid tape speeds. The comparator 537 compares such a reference voltage with the voltage obtained from the tension detecting circuit 527 and generates an error signal appropriate for one selected from the various tape speeds. The correcting circuits 539, 541 and 543 correspond to the tension reference voltage generating circuits 529, 531 and 533, and convert the respective input error signals for the various tape speeds into the most stable control signals. These control signals are selectively switched by the switch 545. The selected control signal is supplied through a driver 16 to a motor 17 as a drive voltage by the switch 547, so that the rotational torque of the supply reel 2 is controlled to maintain tape tension at the tension detecting arm 503 at the maximum value. In other words, during a low-speed tape travel, since a large tape travel load occurs, a tension set value for the position shown at d in FIG. 9 is made small, and as the travel speed of the tape 4 becomes higher, the tension set value is made larger since the tape travel load becomes smaller. Thus, it is possible to keep the tension around the drum 1 constant.

As is apparent from the above description, according to the fifth embodiment, it is possible to always realize appropriate tape tension control by adaptively switching tape tension target values according to each tape speed.

In the description of the embodiment of FIG. 9, it has been stated that the correcting circuits and the reference voltage generating circuits, which serve as tension controlling means, are selectively switched according to each tape travel speed for the purpose of selecting a tension target value according to the tape travel speed. However, if the dynamic characteristics of the tape tension control system do not greatly vary according to tape speeds, a single correcting circuit may be substituted for the correcting circuits in order to make the device compact.

In addition, in the fifth embodiment, the reference voltage generating circuits, the correcting circuits and the selecting switches in the control system may be formed as a single arrangement and control using software may be adopted. It is a matter of course that such an arrangement is also contained in the technical scope of the present invention.

Although in the fifth embodiment an optimum tape tension is obtained by selectively switching the tape tension target values, a similar advantage can also be achieved by altering the loop gain of the control system.

As is apparent from the foregoing description, in accordance with the fifth embodiment, it is possible to realize a constantly optimum, stable head touch irrespective of various tape speeds by providing means for selectively switching the tension control systems according to the various tape speeds.

What is claimed is:

1. A tape drive controlling device which causes a tape to travel from one of first and second reels to the other while maintaining the tape in contact with a head, comprising:

(a) speed detecting means for detecting a travel speed of the tape;

(b) first tension detecting means for detecting a tension of the tape between the head and the first reel;

(c) second tension detecting means for detecting a tension of the tape between the head and the second reel;

(d) reel driving means for driving the first and second reels to cause the tape to travel;

(e) first arithmetic means for making a comparison between a tension value obtained through said first tension detecting means and a first tension reference value and inputting a result of the comparison to said reel driving means;

(f) second arithmetic means for making a comparison between a tension value obtained through said second tension detecting means and a second tension reference value and inputting a result of the comparison to said reel driving means;

(g) third arithmetic means for making a comparison between a speed value obtained through said speed detecting means and a speed reference value; and (h) correcting means for correcting the first tension reference value and/or the second tension reference value on the basis of a result of the comparison obtained through said third arithmetic means.

2. A tape drive controlling device according to claim 1, wherein said reel driving means comprises a drive circuit for each of the first and second reels.

3. A tape drive controlling device according to claim 1, wherein said correcting means has multiplying means for multiplying the result of the comparison obtained through said third arithmetic means by a predetermined coefficient.

4. A tape drive controlling device according to claim 3, wherein said multiplying means includes coefficient multipliers which differ for the respective first and second tension reference values.

5. A tape drive controlling device according to claim 4, further comprising:
first detecting means for detecting a first amount of the corrected first tension reference value which exceeds a first prescribed range; and
second detecting means for detecting a second amount of the corrected second tension reference value which exceeds a second prescribed range, said correcting means adding the first amount to the second tension reference value and adding the second amount to the first tension reference value.

6. A tape drive controlling device according to claim 3, wherein said correcting means includes distributors for distributing an output of said multiplying means in accordance with a ratio of a travel load between the head and the first reel to a travel load between the head and the second reel.

7. A tape drive controlling device according to claim 1, further comprising:
first detecting means for detecting a first amount of the corrected first tension reference value which exceeds a first prescribed range; and
second detecting means for detecting a second amount of the corrected second tension reference value which exceeds a second prescribed range, said correcting means adding the first amount to the second tension reference value and adding the second amount to the first tension reference value.

8. A tape drive controlling device according to claim 1, further comprising selecting means respectively selecting the first and second tension reference values out of a plurality of tension reference values, in accordance with the travel speed of the tape.

9. A tape drive controlling device according to claim 1, further comprising control means for setting the first tension reference value greater than the second tension reference value while the tape is traveling from the first reel toward the second reel.

10. A tape drive controlling device which causes a tape to travel from one of first and second reels to the other while maintaining the tape in contact with a head, comprising:

(a) speed detecting means for detecting a travel speed of the tape;

(b) first tension detecting means for detecting a tension of the tape between the head and the first reel;

(c) second tension detecting means for detecting a tension of the tape between the head and the second reel;

(d) reel driving means for driving the first and second reels to cause the tape to travel;

(e) first arithmetic means for making a comparison between a tension value obtained through said first tension detecting means and a first tension reference value and inputting a result of the comparison to said reel driving means;

(f) second arithmetic means for making a comparison between a tension value obtained through said second tension detecting means and a second tension reference value and inputting a result of the comparison to said reel driving means;

(g) third arithmetic means for making a comparison between a speed value obtained through said speed detecting means and a speed reference value;

(h) coefficient multiplying means for multiplying a result of the comparison obtained through said third arithmetic means by a predetermined coefficient; and (i) correcting means for correcting the first tension reference value and the second tension reference value on the basis of output results from said coefficient multiplying means.

11. A tape drive controlling device according to claim 10, wherein said coefficient multiplying means includes coefficient multipliers which differ for the respective first and second tension reference values.

12. A tape drive controlling device according to claim 11, wherein said coefficient multipliers include leading-stage and trailing-stage coefficient multipliers, said the trailing-stage coefficient multiplier distributing a result output from the leading-stage coefficient multiplier and inputting a distributed result to said correcting means.

13. A tape drive controlling device according to claim 10, further comprising:
first detecting means for detecting a first amount of the corrected first tension reference value which exceeds a first prescribed range; and
second detecting means for detecting a second amount of the corrected second tension reference value which exceeds a second prescribed range, said correcting means adding the first amount to the second tension reference value and adding the second amount to the first tension reference value.

14. A tape drive controlling device according to claim 10, wherein either one of the first and second tension reference values is selected in accordance with the travel speed of the tape.

15. A tape drive controlling device according to claim 10, wherein while the tape is travelling from the first reel toward the second reel, the first tension reference value is set to be greater than the second tension reference value.

16. A recording or reproducing apparatus for performing recording or reproduction while causing a tape to travel with the tape wrapped around a rotary head drum equipped with a head, comprising: (a) first and second reels around which the tape is wound; (b) speed detecting means for detecting a travel speed of the tape; (c) first tension detecting means for detecting a tension of the tape between the rotary head drum and said first reel; (d) second tension detecting means for detecting a tension of the tape between the rotary head drum and said second reel; (e) reel driving means for driving said first and second reels to cause the tape to travel; (f) first arithmetic means for making a comparison between a tension value obtained through said first tension detecting means and a first tension reference value and inputting a result of the comparison to said reel driving means; (g) second arithmetic means for making a comparison between a tension value obtained through said second tension detecting means and a second tension reference value and inputting a result of the comparison to said reel driving means;

(h) third arithmetic means for making a comparison between a speed value obtained through said speed detecting means and a speed reference value; and (i) correcting means for correcting the first tension reference value and/or the second tension reference value on the basis of a result of the comparison obtained through said third arithmetic means.

17. A recording or reproducing apparatus according to claim 16, wherein said reel driving means comprises a drive circuit for each of said first and second reels.

18. A recording or reproducing apparatus according to claim 16, wherein said speed detecting means is provided between the rotary head drum and said first reel.

19. A recording or reproducing apparatus according to claim 16, wherein said correcting means has multiplying means for multiplying the result of the comparison obtained through said third arithmetic means by a predetermined coefficient.

20. A recording or reproducing apparatus according to claim 19, wherein said multiplying means includes coefficient multipliers which differ for the respective first and second tension reference values.

21. A recording or reproducing apparatus according to claim 19, wherein said correcting means includes distributors for distributing an output of said multiplying means in accordance with a ratio of a travel load between the head and said first reel to a travel load between the head and said second reel.

22. A recording or reproducing apparatus according to claim 19, further comprising:

first detecting means for detecting a first amount of the corrected first tension reference value which exceeds a first prescribed range; and second detecting means for detecting a second amount of the corrected second tension reference value which exceeds a second prescribed range, said correcting means adding the first amount to the second tension reference value and adding the second amount to the first tension reference value.

23. A recording or reproducing apparatus according to claim 19, further comprising selecting means respectively selecting the first and second tension reference values out of a plurality of tension reference values, in accordance with the travel speed of the tape.

24. A control method for causing a tape to travel from one of first and second reels to the other while maintaining the tape in contact with a head, comprising the steps of:

controlling driving of the first reel by comparing a result of tape tension between the first reel and the head with a first tension reference value;

controlling driving of the second reel by comparing a result of tape tension between the second reel and the head with a second tension reference value; and correcting the first and/or second tension reference value by obtaining a detection result as to a travel speed of the tape.

25. A control method according to claim 24, wherein the first and/or second tension reference value is corrected by using a value obtained by multiplying, by a predetermined coefficient, a result of comparison between the detection result as to the travel speed of the tape and a speed reference value.

26. A control method according to claim 24, further comprising the steps of:

detecting a first amount of the corrected first tension reference value exceeding a first prescribed range; and detecting a second amount of the corrected second tension reference value exceeding a second prescribed range, said correcting step being practiced by adding the first amount to the second tension reference value and by adding the second amount to the first tension reference value.

27. A control method according to claim 24, wherein either one of the first and second tension reference values is selected in accordance with the travel speed of the tape.

28. A control method according to claim 24, wherein while the tape is travelling from the first reel toward the second reel, the second tension reference value is set to be less than the first tension reference value.

29. A control method according to claim 24, wherein while the tape is travelling from the second reel toward the first reel, the second tension reference value is set to be greater than the first tension reference value.

30. A control method according to claim 24, wherein the travel speed of the tape is detected between the first reel and the head.

* * * * *

UNITED STATES PATENT AND TRADEMARK OFFICE
CERTIFICATE OF CORRECTION

PATENT NO.  : 5,327,304
DATED       : July 5, 1994
INVENTOR(S) : Owada, et al

It is certified that error appears in the above-indentified patent and that said Letters Patent is hereby corrected as shown below:

Col. 5, line 61, change "beth" to --both

Col. 5, line 68, change "Step. S9" to --Step S9-- and change "beth" to --both--

Col. 8, line 1, change "Of" to --of--

Signed and Sealed this

First Day of November, 1994

Attest:

BRUCE LEHMAN

Attesting Officer

Commissioner of Patents and Trademarks